United States Patent [19]

Vogel et al.

[11] Patent Number: 4,743,108

[45] Date of Patent: May 10, 1988

[54] DYNAMIC SHUTTER MECHANISM

[75] Inventors: Richard M. Vogel; Mark D. Fiscella, both of Rochester, N.Y.

[73] Assignee: Eastman Kodak Company, Rochester, N.Y.

[21] Appl. No.: 947,322

[22] Filed: Dec. 29, 1986

[51] Int. Cl.⁴ .............................................. G03B 9/10
[52] U.S. Cl. .................................... 352/216; 352/214; 358/225
[58] Field of Search ............... 352/216, 217, 141, 214; 358/225

[56] References Cited

U.S. PATENT DOCUMENTS

| | | | |
|---|---|---|---|
| 3,300,271 | 1/1967 | Yamamoto | 352/214 |
| 3,303,271 | 2/1967 | Hecker | 178/5 |
| 3,490,835 | 1/1970 | Ornemeth et al. | 352/141 |
| 3,531,194 | 9/1970 | Roppel et al. | 352/216 |
| 3,602,585 | 8/1971 | Steibl et al. | 352/216 |
| 3,787,116 | 1/1974 | Shimizu | 352/141 |
| 4,161,000 | 7/1979 | Cleveland | 358/225 |
| 4,171,529 | 10/1979 | Silberberg et al. | 358/209 |
| 4,257,693 | 3/1981 | Hirata et al. | 352/209 |
| 4,301,476 | 11/1981 | Keller et al. | 358/209 |
| 4,471,388 | 9/1984 | Dischert | 358/320 |
| 4,504,866 | 3/1985 | Saito | 358/213 |
| 4,532,550 | 7/1985 | Bendell et al. | 358/213 |
| 4,545,659 | 10/1985 | Swinehart et al. | 352/216 |
| 4,551,763 | 11/1985 | Swinehart et al. | 358/225 |
| 4,571,629 | 2/1986 | Horio et al. | 358/225 |

FOREIGN PATENT DOCUMENTS 3022786  1/1981  Fed. Rep. of Germany .

Primary Examiner—Monroe H. Hayes
Attorney, Agent, or Firm—William F. Noval

[57] ABSTRACT

A dynamic shutter mechanism for use with a still or motion video camera which is operable at variable shutter speeds to capture high speed events. The shutter mechanism includes a pair of apertured shutter discs which are independently driven by separate motors. Phase lock loop control circuits lock the speed and phase of each disc to the vertical and horizontal sync rates of the video camera. The video signal produced by the video camera produces a control signal which is indicative of the intensity of light of a captured scene. The control signal controls the speed of the shutter mechanism by changing the relative rotational position of the shutters and consequently the relative exposure aperture. In a preferred shutter mechanism the shutter discs are mounted coaxially and are driven by coaxial disc motors.

5 Claims, 2 Drawing Sheets

DYNAMIC SHUTTER MECHANISM

BACKGROUND OF THE INVENTION

This invention relates in general to a dynamic shutter mechanism which as a variable shutter speed to control the exposure of a still or motion video camera. More particularly, this invention relates to a dynamic shutter mechanism having rotating shutter discs which are synched to both the horizontal and vertical sync frequencies of the video camera.

The need often arises for capturing high speed or rapidly changing scenes so that the scene is not blurred when it is played back in slow or stop motion. Where a standard video camera is used to record events, the frame or field rate of the camera is too slow to stop the motion of the event with a likelihood of blurring of the recorded image. Applications where the recording of high speed events may be desirable include athletic events, such as football, baseball, golfing or the like. Thus, it may be desirable to capture the motion of a horse in a horse race or to stop action in a football game in order to analyze the correctness of a referee's call on a play or to analyze the movements of a football player such as those of a quarterback in throwing a football to a receiver. In the case of a still video camera, shutter speeds greater than the frame or field rate of the video signal are also useful when it is desirable to increase the depth of field of a captured scene or when a slow telescopic lens is used with the camera.

Various rotating shutter mechanisms have been proposed for both film and video cameras with mixed results. If the shutter mechanism was manually adjustable, the possibility existed that a specific high speed event would not be captured because an inadequate shutter speed had been chosen by the camera operator. Mechanically adjustable shutter speed control of disc shutters used in motion picture film cameras are disclosed in U.S. Pats. Nos. 3,531,194; 3,602,585; 3,787,116; and 4,257,693. Manually adjustable shutter speed control for video cameras is disclosed in U.S. Pat. Nos. 4,161,003; 4,171,529 and 4,545,659. It should be apparent that many of the manually adjustable shutter speed control systems disclosed in the above patents are complex, bulky and ill suited for use in a lightweight, consumer type camera recorder.

Although automatic shutter speed control has been proposed for both motion picture film and video cameras, such automatic control systems have their limitations. Thus, in U.S. Pat. No. 3,490,835 an automatic film exposure system for motion picture cameras is disclosed in which a solenoid mechanism actuates a pair of spur gears which rotate the shutter discs. This arrangement is bulky and mechanically complex. Another automatic exposure control for motion picture cameras utilizing a pair of motors which independently rotate a pair of shutter discs is disclosed in U.S. Pat. No. 3,300,271. The two shutter discs are held together by a spring in order to intercouple the shutter blades and assure the same rotational speed thereof. Although this shutter mechanism is mechanically simple, it does not have the accuracy of speed control which is expected in modern video camera recorder systems.

An especially relevant disclosure to the present invention is that of U.S. Pat. No. 4,532,550 in which a pair of rotary shutters are driven by separate motors and locked to the vertical sync signal of the video signal by separate phase lock loops. This exposure control system is not as accurate as desired because speed control is sampled only once every 1/60 sec. and does not take into account speed variations in the two motors during the period between vertical sync signals.

SUMMARY OF THE INVENTION

According to the present invention, there is provided a dynamic shutter mechanism for video cameras and the like which is automatic in operation and which has speed control phase locked to both the vertical and horizontal sync signals of the camera to more accurately control the relative speed and phase of the two shutter discs. In a preferred embodiment, the dynamic shutter mechanism includes two shutter discs which are mounted coaxially and which are rotated by coaxial disc motors to produce a compact shutter arrangement.

BRIEF DESCRIPTION OF THE DRAWINGS

In the following description of the drawings, like elements are numbered with like numbers.

DESCRIPTION OF THE PREFERRED EMBODIMENT

Referring now to the figures, there is shown preferred embodiments of the present invention. Although the dynamic shutter mechanism of the present invention will be described with respect to a video camera system, it will be understood that the invention may also be used in motion picture cameras, film video players or the like.

Figure 1:
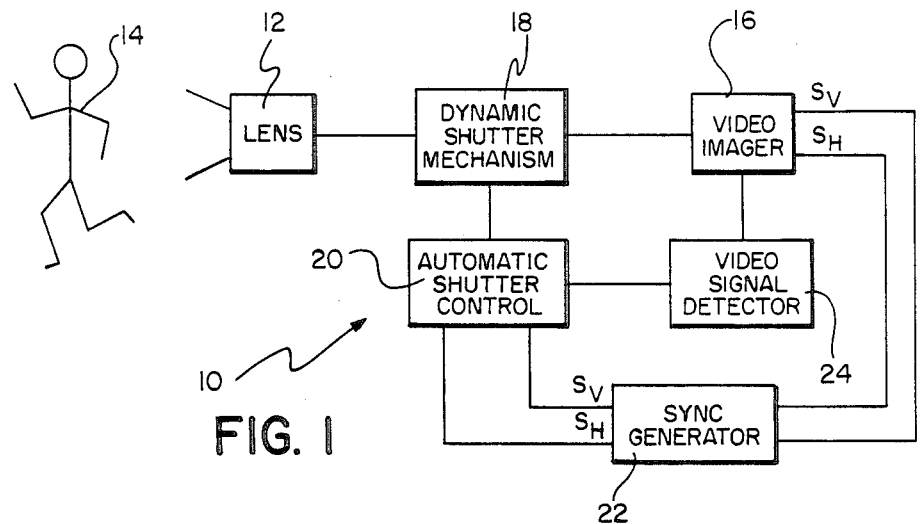
FIG. 1 is a block diagram of a video camera including an embodiment of dynamic shutter mechanism according to the present invention.

Referring to FIG. 1, there is shown a block diagram of a video camera which incorporates the present invention. As shown, a video camera 10 includes a lens 12 for imaging scene 14 on a video imager 16 such as tube or solid state (CCD, MOS) imaging device. A dynamic shutter mechanism 18 is located between lens 12 and imager 16 to vary the shutter speed at which imager 16 is exposed. Shutter mechanism 18 is controlled by automatic shutter control circuit 20. Circuit 20 synchronizes shutter mechanism 18 with the video horizontal and vertical sync signals applied to imager 16 by sync generator 22. Light received by video imager 16 produces a video signal which is detected by peak signal detector 24 to effect control of the shutter speed of mechanism 18. Detector 24 may detect a peak level or an average level of the video signal.

Figure 2:
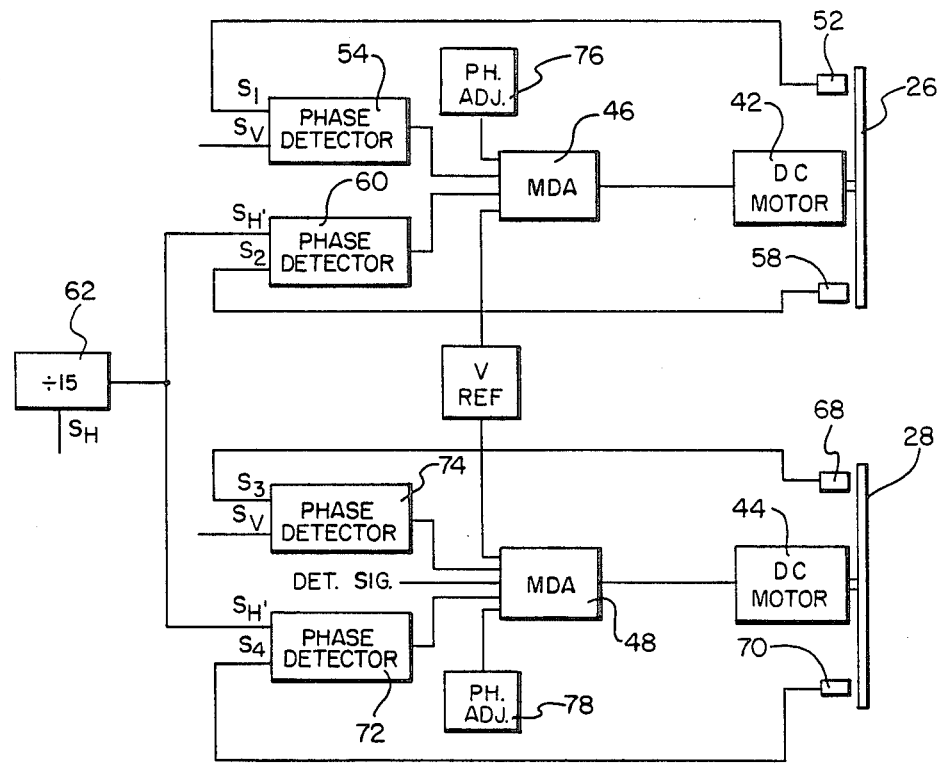
FIG. 2 is a block diagram of the dynamic shutter mechanism and control of the apparatus of FIG. 1.
Figure 3A:
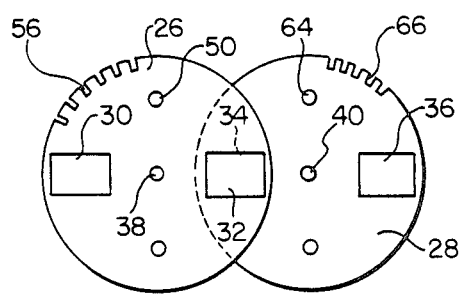
FIGS. 3a and 3b are respectively front elevational and top plan views of one arrangement of the dynamic shutter mechanism of FIG. 1.
Figure 3B:
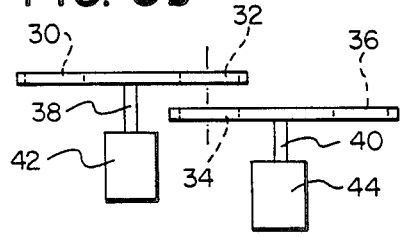

Referring to FIGS. 2, 3a, and 3b, there is shown on embodiment of the present invention. Shutter mechanism 18 includes a pair of shutter discs 26 and 28 respectively having shutter apertures 30, 32 and 34, 36. Discs 26, 28 are respectively mounted on shifts 38, 40 and driven by motors 42, 44. Discs 26 and 28 are mounted side by side so that the optical axis of lens 12 and video imager 16 is intersected by apertures 30, 32 of disc 26 and windows 34, 36 of disc 28. As shown in FIG. 3a, when aperture 34 of disc 28 is aligned with aperture 32 of disc 26, imager 16 will be exposed to light from scene 14. By varying the relative aperture between apertures 34 and 32, the time of exposure (i.e., shutter speed) of imager 16 may be controlled as a function of the brightness of a scene. The maximum shutter speed is a function of the size of apertures 30–36 and as an example may be 1/120 sec. The minimum shutter speed may for example be 1/1000 sec.

FIG. 2 is a block diagram of a control circuit for shutter discs 26 and 28. As shown, DC motor 42 is provided a DC driving voltage by motor driving amplifier (MDA) 46. Similarly, DC motor 44 is provided a DC voltage by MDA 48. Disc 26 is phase locked to the vertical sync signal $S_V$ by means of a signal $S_1$ derived from a first set of indicia 50 which are detected by detector 52. The number of indicia 50 is equal to the number of apertures in a shutter disc. Two indicia 50 are provided on disc 26. Indicia 50 may be optical, so that detector 52 is an optical detector (such as an LED/photodiode detector). Alternatively, indicia 50 may be magnetic in which case detector 52 is a magnetic detector (such as a magnetic coil). The signal $S_1$ produced by detector 52 is compared to the vertical sync signal $S_V$ by phase detector circuit 54. Circuit 54 produces a correction voltage which is applied to MDA 46 to phase lock disc 26 to the vertical sync signal so that the relative position of the aperture window effects exposure of imager 16 during the vertical retrack period. During this period, the imager is not being read out.

Disc 26 is further provided with a second set of indicia 56 (optical, magnetic or the like) which are detected by detector 58. Indicia 56 are equally spaced around the circumference of disc 26. The number of indicia 56 is a function of the horizontal frequency of the video signal. As an example, the number of indicia 56 may equal 35 so that detector 58 produces a signal $S_2$ having a frequency which is 17½ times the frequency of the signal $S_1$ produced by detector 52. Signal $S_2$ is compared to a divided down horizontal sync signal $S_H$, by phase detector 60 to produce a phase correction signal which is also applied to MDA 46. For example, if the horizontal sync frequency is nominally 15,734 Hz, if there are 35 indicia 56 spaced about the circumference of disc 26, the horizontal sync signal $S_H$ is applied to a divide by 15 circuit 62 to produce a horizontal reference signal $S_{H'}$ which has the same frequency as the signal $S_2$ produced by detector 58.

Disc 28 is also provided with two sets of circumferentially spaced indicia. The first set of indicia 64 correspond to the indicia 50 on disc 26 and the second set of indicia 66 correspond to the indicia 56 on disc 26. Indicia 64 are detected by detector 68 and indicia 66 are detected by detector 70. The signal $S_4$ produced by detector 70 is compared to the horizontal reference signal $S_{H'}$ by phase detector 72 to produce a correction voltage applied to MDA 48. Phase detector circuit 74 compares the signal $S_V$ with the signal $S_3$ produced by detector 68 from the indicia 66 on disc 28. Circuit 74 provides a correction voltage to MDA 48 to drive DC motor 44 so that disc 28 is driven in synchronism and at the same speed (1,800 rpm) as disc 26.

By locking the speed of discs 26 and 28 to the horizontal sync signal of imager 16, more accurate speed control is effected over systems which only lock speed to the vertical sync signal since speed comparison is effected much more frequently.

The relative positioning between the apertures of disc 26 and disc 28 is controlled by a peak detector signal $S_3$ produced by peak detector circuit 22. Signal is applied to MDA 48 to control the relative aperture between discs 28 and 26. As the peak video signal increases, indicating a bright scene relative aperture will decrease the intensity of light projected onto imager 16. As the peak video signal decreases indicating the brightness of the scene is decreasing, the relative aperture formed by the positioning of apertures 32, 34, 04 30, 36 of discs 28 and 26 will increase in order to increase the intensity of light on imager 16.

A voltage $V_{REF}$ applied to MDA 46 and MDA 48 provides the nominal free running speed of discs 26 and 28. Variable resistors 76 for motor 42 and 78 for motor 44 are provided for fine adjustment of the phase control.

Figure 4A:
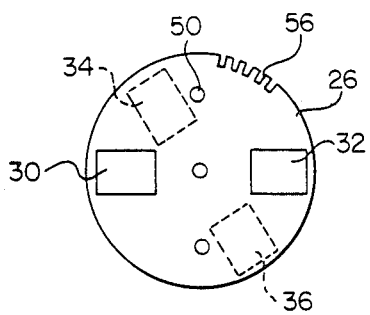
FIGS. 4a and 4b are respectively front elevational and top plan views of another arrangement of the dynamic shutter mechanism of FIG. 1.
Figure 4B:
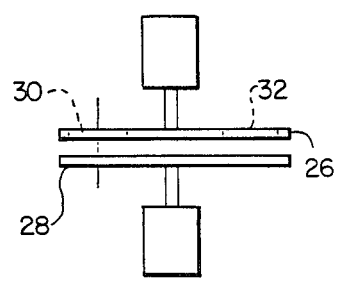

Referring now to FIGS. 4a and 4b, there is shown an alternate configuration of shutter discs 26 and 28. As shown, the axes of rotation of shutter discs 26 and 28 are coaxial but motors 42 and 44 are spaced from each other. This provides a more compact design than the configuration of FIGS. 3a and 3b. Discs 26 and 28 are also respectively provided with two sets of indicia 50, 56 and 64, 66 for effecting control by means of the control circuit of FIG. 2.

Figure 5A:
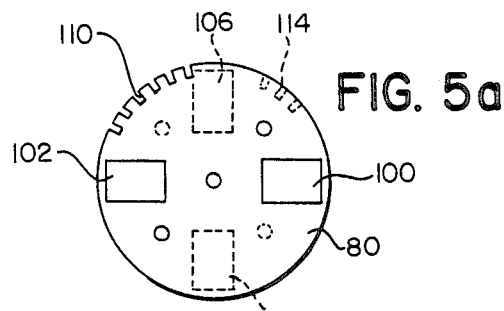
FIGS. 5a, 5b and 5c are respectively front elevational, top plan, and sectional views of a preferred arrangement of the dynamic shutter mechanism of FIG. 1.
Figure 5B:
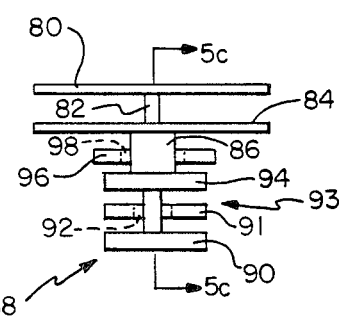
Figure 5C:
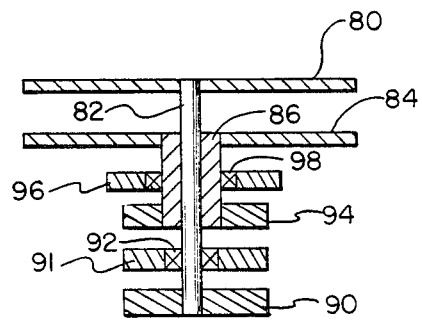

Referring now to FIGS. 5a, 5b and 5c, there is shown a preferred embodiment of shutter configuration according to the present invention. Both the shutter discs and the motors for driving the discs are mounted in a compact configuration which is especially suitable for lightweight and compact video equipment such as a high speed video camcorder. As shown, a first shutter disc 80 is mounted on a centrally disposed shaft 82 and a second shutter disc 84 is mounted on a hollow shaft 86 which is concentric with shaft 82. Shaft 86 is rotatably mounted on shaft 82 so that disc 84 may be rotated independently of disc 80. A first disc motor 88 for driving disc 80 includes a rotor 90 fixed to the end of shaft 82 and a stationary coil 91 having a bearing 92 within which shaft 82 freely rotates. A second disc motor 93 for driving disc 84 includes a rotor 94 fixedly mounted on shaft 86 and a stationary coil 96 having a bearing 98 within which shaft 86 freely rotates. Discs 80 and 84 are provided respectively with sector shaped apertures 100, 102 and 104, 106 which are selectively alignable for exposure of imager 16. Discs 80 and 84 are respectively provided with sets of indicia 108, 110 and 112, 144 similar to indicia 50, 56 and 64, 66 on discs 26 and 28 of FIG. 3a for the control of discs 80 and 84 by the control circuit of FIG. 2.

The invention has been described in detail with particular reference to preferred embodiments thereof, but it will be understood that variations and modifications can be effected within the spirit and scope of the invention.

What is claimed is:

1. In a video imaging system including an imaging device for converting an optical image into a video signal having vertical and horizontal synchronizing signals, dynamic shutter mechanism apparatus comprising:
   a first shutter disc having an aperture which is alignable with said imaging device;
   a second shutter disc having an aperture which alignable with said imaging device;

said first disc shutter having first and second sets of indicia circumferentially disposed about said first shutter disc;

said second shutter disc having first and second sets of indicia disposed about the circumference of said second shutter disc;

first and second motor means for respectively rotating said first and second shutter discs;

first and second motor drive amplifier means for respectively driving said first and second motor means;

means for applying a reference speed voltage to said first and second motor drive amplifier means;

first detector means for detecting the first and second sets of indicia on said first shutter disc to produce first and second signals $S_1$ and $S_2$ having frequencies which are a function of the rotational speed of said first shutter disc;

first phase detector circuit means for comparing said first signal $S_1$ with the vertical sync signal $S_V$ to produce a first correction voltage applied to said motor driver amplifier means to phase lock the first shutter disc to said vertical sync signal;

a second phase detector circuit means for comparing a signal $S_{H'}$ which is a function of said horizontal sync signal $S_H$ for producing a second correction signal which is applied to said first motor driver amplifier to phase lock said first disck to said horizontal sync signal;

second detector means for detecting the third and fourth sets of indicia on said second shutter disc to produce third and fourth signals $S_3$ and $S_4$ which are a function of the speed of rotation of said second shutter disc;

third phase detector means for comparing said vertoca; signal $S_V$ and said third signal $S_3$ to produce a third correction voltage applied to said second motor driver amplifier to phase lock the rotational speed of said second disc to said vertical sync signal $S_V$;

a fourth phase detector circuit for comparing the fourth signal $S_4$ produced by said second detector means with the signal $S_{H'}$ derived from said horizontal sync signal and for producing a fourth correction signal applied to said second motor driver amplifier; and means for producing a signal $S_5$ which is a function of the scene brightness of an image on said imaging device, said signal $S_5$ being applied to said second motor driver amplifier such that said second motor drives said second shutter disc in synchronism with said first shutter disc, but such that said shutter discs are displaced rotationally with respect to each other so that the relative aperture of aligned apertures of said first and second shutter discs is varied to allow more or less light to fall on said imaging device as a function of the scene brightness.

2. The shutter mechanism apparatus of claim 1 wherein said first and second shutter discs are mounted in a side by side configuration.

3. The shutter mechanism apparatus of claim 1 wherein said first and second shutter discs are mounted coaxially but spaced from each other.

4. The shutter mechanism of claim 1 wherein said first shutter disc is mounted on a first shaft, said second shutter disc is mounted on a second hollow shaft which is freely rotatably mounted on said first shaft and wherein said first motor includes a first rotor fixed to said first shaft and a stationary first stater coil axially spaced from said first rotor and wherein said second motor includes a second rotor which is fixed to said second hollow shaft and which is concentrically mounted with respect to said first shaft such that said first shaft rotates freely within said second rotor and a stationary second stater coil axially spaced from said second rotor and concentric with said second shaft, said second shaft rotates freely within said second coil.

5. In an imaging device including an optical axis, dynamic shutter mechanism apparatus comprising:

a first shutter disc having an aperture which is alignable with said optical axis of said imaging device;

a second shutter disc having an aperture which is alignable with said optical axis;

means for mounting said first shutter disc on a first shaft;

means for mounting said second shutter disc on a second hollow shaft which is freely rotatably mounted on said first shaft;

a first motor for rotating said first shaft and including (1) a first rotor fixed to said first shaft and (2) a stationary first stator coil axially spaced from said rotor;

a second motor for rotating said second shaft and including (1) a second rotor which is fixed to said second hollow shaft, and which is concentrically mounted with respect to said first shaft such that said first shaft rotates freely within said second rotor and (2) a stationary second stator coil axially spaced from said second rotor and concentric with said second shaft such that said second shaft rotates freely within said second coil.

* * * * *